(12) United States Patent
Hashimoto et al.

(10) Patent No.: US 9,806,336 B2
(45) Date of Patent: Oct. 31, 2017

(54) POSITIVE ELECTRODE FOR NONAQUEOUS ELECTROLYTE SECONDARY BATTERIES, AND NONAQUEOUS ELECTROLYTE SECONDARY BATTERY

(71) Applicants: Tatsuya Hashimoto, Osaka (JP); Yusuke Fukumoto, Toyonaka (JP); Keisuke Ohara, Osaka (JP); Yuji Yokoyama, Moriguchi (JP)

(72) Inventors: Tatsuya Hashimoto, Osaka (JP); Yusuke Fukumoto, Toyonaka (JP); Keisuke Ohara, Osaka (JP); Yuji Yokoyama, Moriguchi (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 193 days.

(21) Appl. No.: 14/429,583

(22) PCT Filed: Sep. 21, 2012

(86) PCT No.: PCT/JP2012/074300
§ 371 (c)(1),
(2) Date: Mar. 19, 2015

(87) PCT Pub. No.: WO2014/045418
PCT Pub. Date: Mar. 27, 2014

(65) Prior Publication Data
US 2015/0255786 A1 Sep. 10, 2015

(51) Int. Cl.
*H01M 4/36* (2006.01)
*H01M 10/05* (2010.01)
(Continued)

(52) U.S. Cl.
CPC ............ *H01M 4/366* (2013.01); *H01M 4/13* (2013.01); *H01M 4/139* (2013.01); *H01M 10/05* (2013.01);
(Continued)

(58) Field of Classification Search
None
See application file for complete search history.

(56) References Cited

U.S. PATENT DOCUMENTS

2010/0092864 A1* 4/2010 Yokomizo ............. H01M 4/133
429/212
2011/0168550 A1* 7/2011 Wang ...................... H01M 4/13
204/290.12
(Continued)

FOREIGN PATENT DOCUMENTS

JP 2006-210089 A 8/2006
JP 2007220454 A 8/2007
(Continued)

*Primary Examiner* — Ula C Ruddock
*Assistant Examiner* — Matthew Van Oudenaren
(74) *Attorney, Agent, or Firm* — Sughrue Mion, PLLC (57) ABSTRACT

Provided is a positive electrode for nonaqueous electrolyte secondary batteries including a positive electrode mixture layer formed of a positive electrode mixture paste containing a positive electrode active material. The positive electrode active material has a particle diameter of 2 μm or more and less than 7 μm. The positive electrode mixture layer includes a first mixture layer in which a maximum diameter of pores formed between particles of the positive electrode active material is more than 1.0 μm and 5.0 μm or less, and a second mixture layer in which a maximum diameter of the pores is 1.0 μm or less. The second mixture layer is arranged closer to the current collector than the first mixture layer. A ratio of a thickness of the first mixture layer to a thickness of the second mixture layer is more than 0.1 and 1.0 or less.

4 Claims, 3 Drawing Sheets

(51) Int. Cl.
*H01M 4/13* (2010.01)
*H01M 4/139* (2010.01)
H01M 2/34 (2006.01)
H01M 10/0525 (2010.01)
H01M 4/02 (2006.01)

(52) U.S. Cl.
CPC ........ *H01M 2/345* (2013.01); *H01M 10/0525* (2013.01); *H01M 2004/021* (2013.01); *H01M 2004/028* (2013.01)

(56) References Cited

U.S. PATENT DOCUMENTS

| | | |
|---|---|---|
| 2011/0183207 A1 | 7/2011 | Hirose et al. |
| 2011/0183211 A1 | 7/2011 | Uchida et al. |
| 2012/0244433 A1 | 9/2012 | Yamasaki |

FOREIGN PATENT DOCUMENTS

| | | |
|---|---|---|
| JP | 2010-135272 A | 6/2010 |
| JP | 2011-154901 A | 8/2011 |
| JP | 2012-138217 A | 7/2012 |
| KR | 1020090038884 A | 4/2009 |
| WO | 2011/004447 A1 | 1/2011 |
| WO | 2011/070661 A1 | 6/2011 |

\* cited by examiner

|  | Upper and lower layers ratio (A／B) | Electrode maximum pore size | Number of operations of CID at time of overcharge (out of 10) | Capacity retention rate after cycle test (%) | Battery resistance (mΩ) |
|---|---|---|---|---|---|
| Example 1 | 0.50 | 3.1 | 10 | 87 | 3.15 |
| Example 2 | 0.15 | 3.0 | 10 | 86 | 3.12 |
| Example 3 | 0.88 | 3.1 | 10 | 88 | 3.17 |
| Example 4 | 0.50 | 1.2 | 10 | 85 | 3.14 |
| Example 5 | 0.50 | 4.7 | 10 | 87 | 3.16 |
| Comparative Example 1 | 0.07 | 3.0 | 5 | 83 | 3.13 |
| Comparative Example 2 | 1.14 | 3.0 | 10 | 77 | 3.54 |
| Comparative Example 3 | 0.50 | 0.4 | 2 | 84 | 3.12 |
| Comparative Example 4 | 0.50 | 8.4 | 10 | 75 | 3.63 |
| Comparative Example 5 | 0.50 | 3.1 | 10 | 74 | 3.64 |
| Comparative Example 6 | 0.50 | 0.1 | 1 | 84 | 3.13 |

POSITIVE ELECTRODE FOR NONAQUEOUS ELECTROLYTE SECONDARY BATTERIES, AND NONAQUEOUS ELECTROLYTE SECONDARY BATTERY

CROSS REFERENCE TO RELATED APPLICATIONS

This is a National Stage of International Application No. PCT/JP2012/074300 filed Sep. 21, 2012, the contents of which are incorporated herein by reference in its entirety.

TECHNICAL FIELD

The present invention relates to a positive electrode for nonaqueous electrolyte secondary batteries, which is capable of efficiently generating gas in a positive electrode mixture layer at the time of overcharge while maintaining high-rate characteristics, and a nonaqueous electrolyte secondary battery.

BACKGROUND ART

Conventionally, in a nonaqueous electrolyte secondary battery such as a lithium ion secondary battery, for example, a positive electrode mixture paste obtained by kneading electrode materials such as a positive electrode active material, a conductive material and a binding material (binder) together with a solvent is applied to a current collector and dried to form a positive electrode mixture layer, thereby preparing a positive electrode. In addition, a negative electrode mixture paste obtained by kneading electrode materials such as a negative electrode active material, a thickener and a binding material is applied to a current collector and dried to form a negative electrode mixture layer, thereby preparing a negative electrode.

The positive electrode, the negative electrode and a separator interposed between the positive electrode and the negative electrode are wound to form an electrode body, and the electrode body impregnated with an electrolyte solution is housed in a case to form a nonaqueous electrolyte secondary battery.

The case is provided with a positive electrode terminal and a negative electrode terminal each protruding to the outside, and the positive electrode terminal and the negative electrode terminal are connected to the positive electrode and the negative electrode through a first collecting terminal and a second collecting terminal, respectively.

A current interrupt device is interposed between the positive electrode terminal and the first collecting terminal. If the pressure inside the case becomes higher than a predetermined value, the current interrupt device operates to interrupt electrical connection between the positive electrode terminal and the first collecting terminal, which is a current path of the nonaqueous electrolyte secondary battery.

The electrolyte solution in the nonaqueous electrolyte secondary battery contains an additive that is decomposed on the surface of the positive electrode to generate gas at the time of overcharge of the nonaqueous electrolyte secondary battery, and the gas generated by the additive increases the pressure inside the case.

For properly operating the current interrupt device, it is important to efficiently generate gas at the time of overcharge of the nonaqueous electrolyte secondary battery. For efficiently generating gas and efficiently releasing the generated gas from the positive electrode mixture layer, it is effective to make the positive electrode mixture layer of the positive electrode porous.

Figure 4:
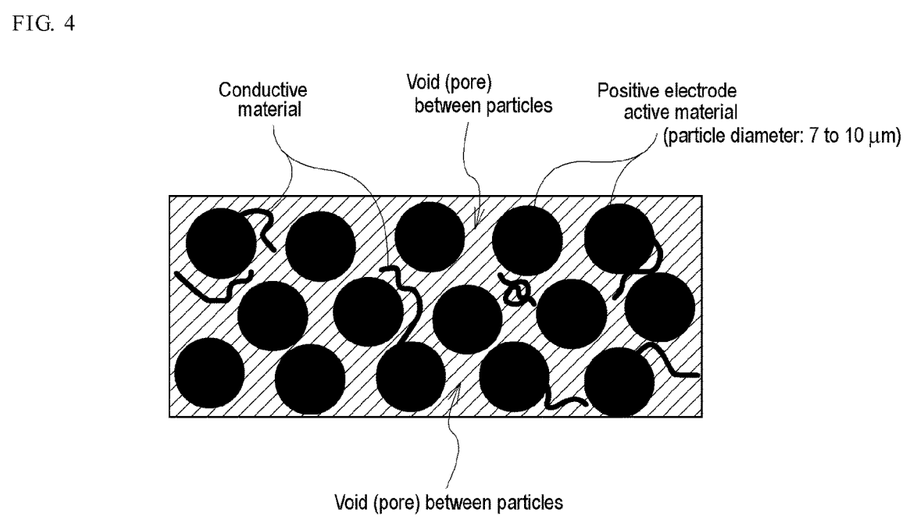
FIG. 4 is a side sectional view showing a conventional positive electrode mixture layer in which the particle diameter of a positive electrode active material is made large.

The size of voids (pores) between positive electrode active material particles can be increased to improve the porosity of the positive electrode mixture layer when the particle diameter of the positive electrode active material contained in the positive electrode mixture layer is made large (e.g., 7 to 10 μm) as shown in FIG. 4, for example. However, when the particle diameter of positive electrode active material particles is increased as described above, electric conductivity in particles and between particles becomes insufficient. As a result, the internal resistance of the nonaqueous electrolyte secondary battery increases, leading to deterioration of the high-rate characteristics, for example, at the time of discharging the battery at a large current.

As described in Patent Literature 1, when the positive electrode mixture layer is formed, microbubbles are added to a positive electrode mixture paste to reduce the density of the positive electrode mixture paste, and the positive electrode mixture paste is applied to a current collector to prepare the positive electrode, which may improve the porosity of the positive electrode mixture layer.

However, the technique described in Patent Literature 1 has the following problem: microbubbles are added throughout the positive electrode mixture paste, and many voids exist not only on a surface of the positive electrode mixture layer but also in the vicinity of the current collector. Therefore, electric conductivity in particles and between particles of the positive electrode active material becomes insufficient, and the internal resistance of the positive electrode increases, leading to deterioration of the high-rate characteristics of the nonaqueous electrolyte secondary battery.

Figure 5:
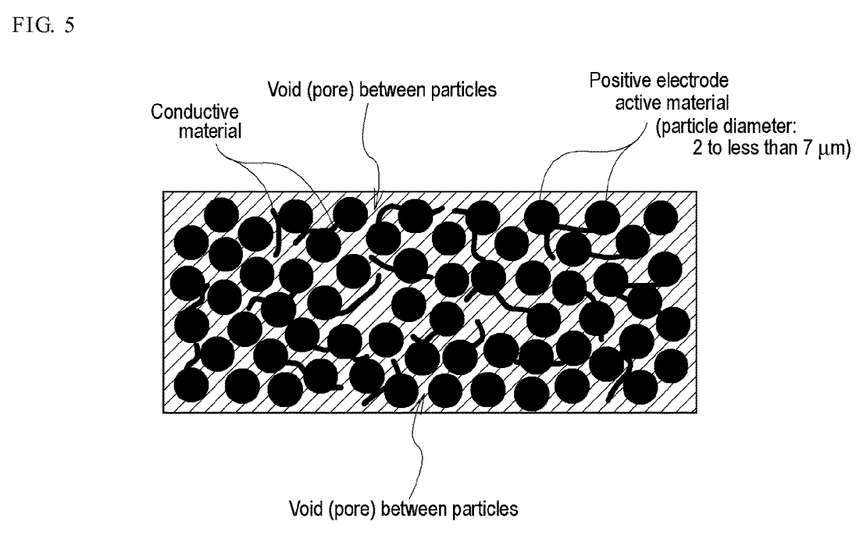
FIG. 5 is a side sectional view showing a conventional positive electrode mixture layer in which the particle diameter of a positive electrode active material is made small as a whole.

On the other hand, as shown in FIG. 5, if the particle diameter of positive electrode active material particles is made small (e.g., 2 to less than 7 μm) as a whole, conductivity in particles and between particles can be secured, and high-rate characteristics can be improved. However, the distance between particles decreases, and the size of voids between positive electrode active material particles is reduced. As a result, generation of gas in the positive electrode mixture layer is suppressed at the time of overcharge, and the generated gas is hard to be released from the inside of the positive electrode mixture layer, which makes it difficult to reliably operate the current interrupt device.

CITATION LIST

Patent Literature

Patent Literature 1: WO 2011/004447

SUMMARY OF INVENTION

Problem to be Solved by the Invention

The present invention provides a positive electrode for nonaqueous electrolyte secondary batteries, and a nonaqueous electrolyte secondary battery, each of which is capable of efficiently generating gas in a positive electrode mixture layer at the time of overcharge and efficiently releasing the gas generated in a positive electrode active material layer from the active material layer while maintaining high-rate characteristics.

Means for Solving the Problem

A positive electrode for nonaqueous electrolyte secondary batteries and a nonaqueous electrolyte secondary battery for solving the above-mentioned problems have the following features.

A first aspect of the invention is a positive electrode for nonaqueous electrolyte secondary batteries including a current collector, and a positive electrode mixture layer formed by applying a positive electrode mixture paste to the current collector, the positive electrode mixture paste containing a positive electrode active material. The positive electrode active material has a particle diameter of 2 µm or more and less than 7 µm. The positive electrode mixture layer includes a first mixture layer in which a maximum diameter of pores formed between particles of the positive electrode active material is more than 1.0 µm and 5.0 µm or less, and a second mixture layer in which a maximum diameter of the pores is 1.0 µm or less. The second mixture layer is arranged closer to the current collector than the first mixture layer. A ratio of a thickness of the first mixture layer to a thickness of the second mixture layer is more than 0.1 and 1.0 or less.

A second aspect of the invention is a nonaqueous electrolyte secondary battery including the above-mentioned positive electrode.

Effects of the Invention

The present invention exerts the following effects.

The present invention makes it possible to efficiently generate gas in a positive electrode mixture at the time of overcharge and efficiently release the gas generated in the positive electrode active material layer from the positive electrode active material layer while maintaining the high-rate characteristics of a nonaqueous electrolyte secondary battery.

DESCRIPTION OF EMBODIMENTS

An embodiment for carrying out the present invention will be described with reference to the attached drawings.

Figure 1:
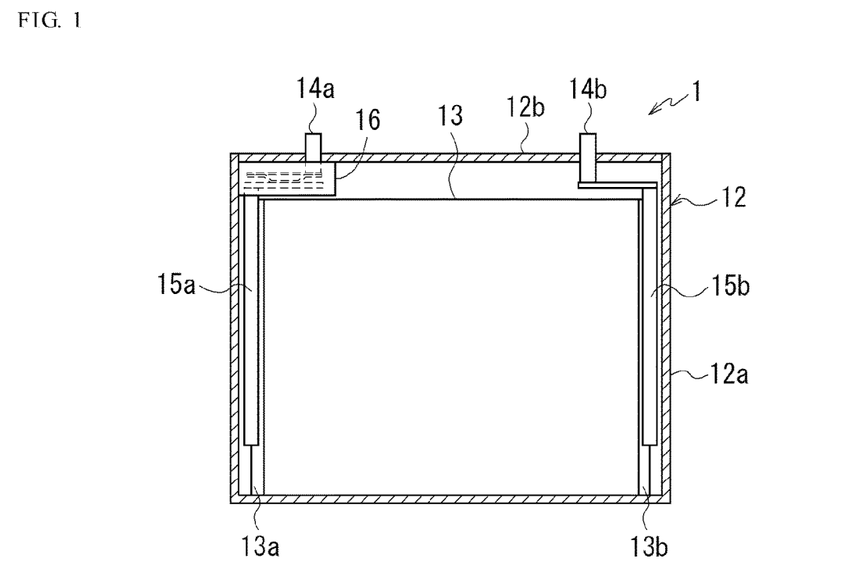
FIG. 1 is a side sectional view showing a nonaqueous electrolyte secondary battery according to an embodiment of the present invention.

As shown in FIG. 1, a nonaqueous electrolyte secondary battery 1 according to the present invention is configured such that a positive electrode 13a and a negative electrode 13b as electrodes of the nonaqueous electrolyte secondary battery 1, and a separator interposed between the positive electrode 13a and the negative electrode 13b are wound to form an electrode body 13, and the electrode body 13 is impregnated with an electrolyte solution, and enclosed in a case 12.

The positive electrode 13a, which includes a positive electrode mixture layer formed on each of both surfaces of a current collector, is prepared in the following manner: electrode materials such as a positive electrode active material, a conductive material and a binding material (binder) are kneaded in a kneader together with a solvent to obtain a positive electrode mixture paste, and the positive electrode mixture paste is applied to the current collector for positive electrode, and dried to form the positive electrode mixture layer.

The negative electrode 13b, which includes a negative electrode mixture layer formed on each of both surfaces of a current collector, is prepared in the following manner: electrode materials such as a negative electrode active material, a thickener and a binding material are kneaded in a kneader to obtain a negative electrode mixture paste, and the negative electrode mixture paste is applied to the current collector for negative electrode, and dried to form the negative electrode mixture layer.

The case 12 includes a bottomed rectangular cylinder-shaped case body 12a in which one surface (upper surface) is opened; and a lid body 12b which is formed in a flat plate shape and closes the opening of the case body 12a. A positive electrode terminal 14a is provided at one end portion of the lid body 12b in the longitudinal direction (left end portion in FIG. 1), and a negative electrode terminal 14b is provided at the other end portion of the lid body 12b in the longitudinal direction (right end portion in FIG. 1).

The positive electrode terminal 14a is connected to the positive electrode 13a through a first collecting terminal 15a, and the negative electrode terminal 14b is connected to the negative electrode 13b through a second collecting terminal 15b.

A current interrupt device 16 is interposed between the positive electrode terminal 14a and the first collecting terminal 15a. If the pressure inside the case 12 becomes higher than a predetermined value, the current interrupt device 16 operates to interrupt electrical connection between the positive electrode terminal 14a and the first collecting terminal 15a, which provides a current path of the nonaqueous electrolyte secondary battery 1.

In the nonaqueous electrolyte secondary battery 1, as the materials that form the positive electrode mixture of the positive electrode 13a, for example a "Li(Ni, Mn, Co)$O_2$-based active material" can be used as the positive electrode active material, for example "acetylene black (AB)" can be used as the conductive material, for example "polyvinylidene fluoride (PVdF)" can be used as the binding material (binder), and for example "N-methyl-2-pyrrolidone (NMP)" can be used as the solvent.

As the materials that form the negative electrode mixture of the negative electrode 13b, for example "graphite" can be used as the negative electrode active material, for example "CMC (carboxymethyl cellulose)" can be used as the thickener, and for example "SBR (styrene-butadiene rubber)" can be used as the binding material.

As the electrolyte solution of the nonaqueous electrolyte secondary battery 1, a solution obtained by dissolving a lithium salt such as "$LiPF_6$" in an organic solvent such as "EC (ethylene carbonate)", "DMC (dimethyl carbonate)" or "EMC (ethylmethyl carbonate)" can be used.

The electrolyte solution contains an overcharge preventing additive such as "CHB (cyclohexyl benzene)" or "BP (biphenyl)". At the time of overcharge of the nonaqueous electrolyte secondary battery 1, the overcharge preventing additive is decomposed on the surface of the positive electrode to suppress an overcharge reaction. The overcharge preventing additive is decomposed to generate gas. Alternatively, the overcharge preventing additive is further reduced to generate gas.

Next, the positive electrode 13a will be described in detail.

Figure 2:
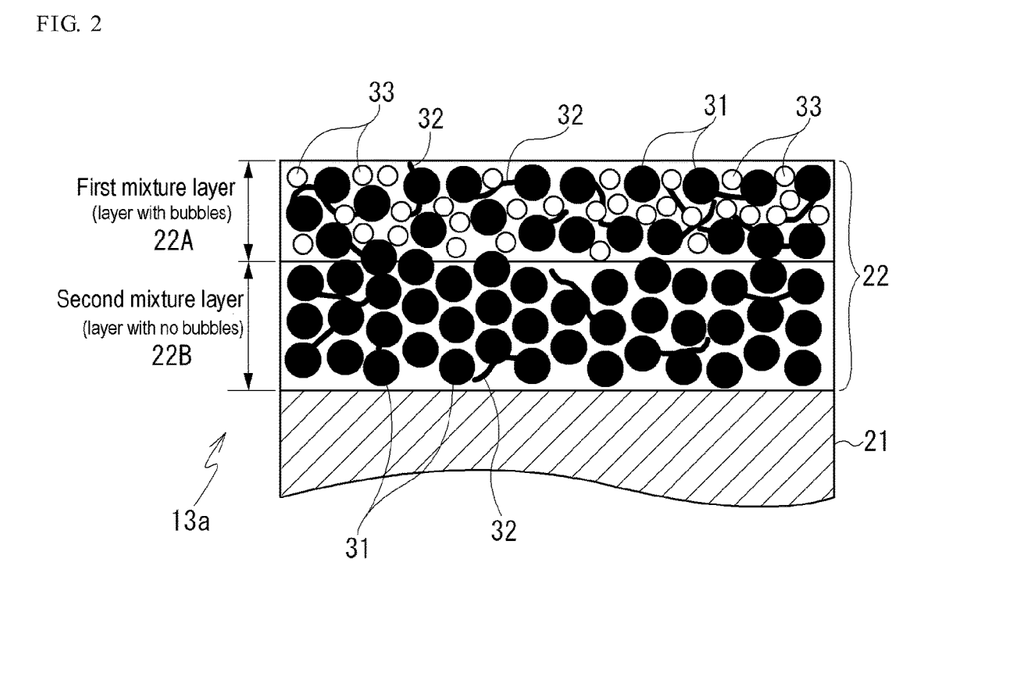
FIG. 2 is a side sectional view showing a positive electrode mixture layer of a positive electrode.

As shown in FIG. 2, a positive electrode mixture layer 22 includes a first mixture layer 22A and a second mixture layer 22B, and the second mixture layer 22B is arranged closer to a current collector 21 than the first mixture layer 22A. That is, the second mixture layer 22B and the first mixture layer 22A are stacked in this order on the current collector 21, and the first mixture layer 22A is situated on the surface side of the positive electrode 13a.

The positive electrode 13a is formed in the following manner: a second positive electrode mixture paste prepared by kneading a positive electrode active material, a conductive material and a binding material (binder) together with a solvent is applied to a surface of the current collector 21, a first positive electrode mixture paste prepared by dispersing microbubbles in a paste prepared by kneading a positive electrode active material, a conductive material and a binding material (binder) together with a solvent is applied onto the second positive electrode mixture paste applied to the surface of the current collector 21, the second positive electrode mixture paste and the first positive electrode mixture paste are dried, and further, the dried second positive electrode mixture paste and first positive electrode mixture paste are pressed to a predetermined thickness.

In the positive electrode 13a, a portion where the first positive electrode mixture paste is applied is the first mixture layer 22A, and a portion where the second positive electrode mixture paste is applied is the second mixture layer 22B.

The microbubbles to be dispersed in the first positive electrode mixture paste are very fine bubbles having a diameter in the order of micrometers, and can be generated using a known microbubble generator or the like. As gas of microbubbles, gas that can stably exist in the paste, such as air, carbon dioxide gas, nitrogen gas or argon gas, can be used.

The first mixture layer 22A contains particles of a positive electrode active material 31 having a particle diameter of 2 μm or more and less than 7 μm, and a conductive material 32, and pores 33 formed from microbubbles dispersed in the first positive electrode mixture paste are formed between the particles of the positive electrode active material 31. The pores 33 are formed so as to have a maximum diameter of more than 1.0 μm and 5.0 μm or less.

The second mixture layer 22B contains particles of the positive electrode active material 31 having a particle diameter of 2 μm or more and less than 7 μm, and the conductive material 32, and pores having a maximum diameter of 1.0 μm or less are formed between the particles of the positive electrode active material 31.

As described above, in the second mixture layer 22B, the positive electrode active material 31 is formed so as to have a small particle diameter of 2 μm or more and less than 7 μm as a whole, and the distance between the particles of the positive electrode active material 31 decreases, so that pores as voids between the particles also have a small maximum diameter of 1.0 μm or less.

Consequently, conductivity in particles and between particles in the second mixture layer 22B formed directly on a surface of the current collector 21 can be sufficiently secured to improve the high-rate characteristics of the nonaqueous electrolyte secondary battery 1, so that charge-discharge can be performed at high output.

On the other hand, in the first mixture layer 22A, the positive electrode active material 31 is formed so as to have a small particle diameter of 2 μm or more and less than 7 μm as a whole, but since microbubbles are dispersed in the first positive electrode mixture paste applied in formation of the first mixture layer 22A, pores 33 having a large maximum diameter of more than 1.0 μm and 5.0 μm or less are formed between the particles of the positive electrode active material 31 in the first mixture layer 22A.

Consequently, in the first mixture layer 22A formed on the upper layer of the second mixture layer 22B (on the surface layer side of the positive electrode mixture layer 22), the reactivity of the above-mentioned additive at the time of overcharge of the nonaqueous electrolyte secondary battery 1 can be secured to sufficiently generate gas, and to improve releasability of the generated gas from the first mixture layer 22A. Therefore, at the time of overcharge of the nonaqueous electrolyte secondary battery 1, the pressure inside the case 12 can be sufficiently increased by filling the case 12 with gas, so that the current interrupt device 16 can be reliably operated.

The first mixture layer 22A and the second mixture layer 22B are formed such that a ratio (A/B) of a thickness A of the first mixture layer 22A to a thickness B of the second mixture layer 22B is more than 0.1 and 1.0 or less (0.1<(A/B)≤1.0).

By forming the first mixture layer 22A and the second mixture layer 22B in this thickness ratio, gas can be sufficiently generated in the case 12 while an increase in resistance at a low SOC is suppressed to improve the high-rate characteristics of the nonaqueous electrolyte secondary battery 1.

As described above, when the particle diameter of the positive electrode active material 31 contained in the positive electrode mixture layer 22 (first mixture layer 22A and second mixture layer 22B) is 2 μm or more and less than 7 μm, the positive electrode mixture layer 22 includes the second mixture layer 22B formed on a surface of the current collector 21 and the first mixture layer 22A formed on a surface of the second mixture layer 22B, the maximum diameter of pores 31 formed between the particles of the positive electrode active material 31 in the first mixture layer 22A is more than 1.0 μm and 5.0 μm or less, the maximum diameter of pores formed between the particles of the positive electrode active material 31 in the second mixture layer 22B is 1.0 μm or less, and the ratio (A/B) of the thickness A of the first mixture layer 22A to the thickness B of the second mixture layer 22B is more than 0.1 and 1.0 or less, gas can be efficiently generated in the positive electrode mixture layer 22 at the time of overcharge and the gas generated in the positive electrode active material layer 22 can be efficiently released from the positive electrode active material layer 22 while the high-rate characteristics of the nonaqueous electrolyte secondary battery 1 are maintained.

EXAMPLES

Examples of the nonaqueous electrolyte secondary battery 1 formed by using the positive electrode 13a provided with the positive electrode mixture layer 22 including the first mixture layer 22A and the second mixture layer 22B in this embodiment will be described. In examples in this embodiment, nonaqueous electrolyte secondary batteries of Examples 1 to 5 were prepared in the following manner.

Nonaqueous electrolyte secondary batteries of Comparative Examples 1 to 6 were prepared for comparison with the examples.

Example 1

A second positive electrode mixture paste for forming the second mixture layer 22B was prepared by using a positive electrode active material having an average particle diameter d50 of 5.7 μm and comprising a "lithium composite oxide (Li(Ni, Mn, Co)O$_2$)" as a positive electrode active material, "acetylene black (AB)" as a conductive material, and "polyvinylidene fluoride (PVdF)" as a binding material; mixing the positive electrode active material, the conductive material and the binding material in a ratio (weight ratio) of 100:5:2; and kneading the mixture using "N-methyl-2-pyrrolidone (NMP)" as a solvent.

A first positive electrode mixture paste for forming the first mixture layer 22A was prepared by preparing a positive electrode mixture paste similar to the second positive electrode mixture paste except that a positive electrode active material having an average particle diameter d50 of 3.0 μm and comprising a "lithium composite oxide (Li(Ni, Mn, Co)O$_2$)" was used as a positive electrode active material; and dispersing air microbubbles, which were generated in an AURA JET apparatus manufactured by AURA TEC and had an average bubble diameter of 3.2 μm, in the prepared positive electrode mixture paste.

Next, after the second positive electrode mixture paste was applied onto each of both surfaces of a 15 μm-thick aluminum foil as the current collector 21 in an amount of 10 mg/cm$^2$, the first positive electrode mixture paste was applied in an amount of 5 mg/cm$^2$ onto the second positive electrode mixture paste applied onto each of both surfaces of the aluminum foil. After that, the second positive electrode mixture paste and the first positive electrode mixture paste were dried by hot air of 120° C., and then were pressed to a predetermined thickness to form the positive electrode mixture layer 22 including the second mixture layer 22B and the first mixture layer 22A on the current collector 21.

Further, the current collector 21 provided with the positive electrode mixture layer 22 was cut to a predetermined size to prepare the positive electrode 13a. In the prepared positive electrode 13a, the electrode plate thickness is 170 μm, the electrode plate length is 4500 mm, and the width of the positive electrode mixture layer 22 in the electrode plate is 94 mm.

The ratio (A/B) of the thickness A of the first mixture layer 22A to the thickness B of the second mixture layer 22B in the positive electrode mixture layer 22 of the positive electrode 13a is 0.5.

When a pore size distribution in the positive electrode mixture layer 22 of the positive electrode 13a was measured using a mercury porosimeter, and a maximum value (dmax) of pore sizes was determined, it was found that dmax was 3.1 μm.

A negative electrode mixture paste was produced by using "graphite" as a negative electrode active material, "carboxymethyl cellulose (CMC)" as a thickener and "styrene-butadiene rubber (SBR)" as a binding material; mixing the negative electrode active material, the thickener and the binding material in a ratio (weight ratio) of 100:1:1; and kneading the mixture.

The negative electrode mixture paste produced in this manner was applied in an amount of 27 mg/cm$^2$ onto each of both surfaces of a current collector formed of a 14 μm-thick copper (Cu) foil, and was dried, pressed and cut similarly to the positive electrode 13a to prepare the negative electrode 13b. In the prepared negative electrode 13b, the electrode plate thickness is 150 μm, the electrode plate length is 4700 mm, and the width of the negative electrode mixture layer in the electrode plate is 100 mm.

As the separator, a separator having a three-layer structure of polypropylene (PP)/polyethylene (PE)/polypropylene (PP), and having a thickness of 20 μm was used.

The positive electrode 13a, the negative electrode 13b, and the separator interposed between the positive electrode 13a and the negative electrode 13b were wound in the form of an ellipsoid to form the electrode body 13. The positive electrode 13a and the negative electrode 13b of the electrode body 13 are connected, respectively, to the first collecting terminal 15a and the second collecting terminal 15b each mounted on the lid body 12b of the case 12, and the electrode body 13 is stored in the case body 12a together with an electrolyte solution to form the nonaqueous electrolyte secondary battery 1. The nonaqueous electrolyte secondary battery 1 thus formed was defined as the nonaqueous electrolyte secondary battery 1 of Example 1.

As the electrolyte solution, a solution obtained by dissolving LiPF$_6$ in a concentration of 1.0 M in a solvent obtained by mixing EC (ethylene carbonate), DMC (dimethyl carbonate) and EMC (ethylmethyl carbonate) in a ratio (weight ratio) of 3:4:3. To the electrolyte solution were added CHB (cyclohexyl benzene) and BP (biphenyl) each in an amount of 1 wt % as an overcharge preventing additive.

The internal pressure operation-type current interrupt device 16 was provided between the positive electrode terminal 14a and the first collecting terminal 15a, and the design interruption pressure thereof was set to 0.7 MPa. The rated capacity of the nonaqueous electrolyte secondary battery 1 was set to 24.0 Ah.

Example 2

The positive electrode 13a of Example 2 was prepared in the same manner as in Example 1 except that the second positive electrode mixture paste of Example 1 was applied onto each of both surfaces of a 15 μm-thick aluminum foil as the current collector 21 in an amount of 13 mg/cm$^2$, and the first positive electrode mixture paste of Example 1 was then applied in an amount of 2 mg/cm$^2$ onto the second positive electrode mixture paste applied onto each of both surfaces of the aluminum foil. The nonaqueous electrolyte secondary battery 1 of Example 2 was formed in the same manner as in Example 1 except that the positive electrode 13a of Example 2 was used.

The ratio (A/B) of the thickness A of the first mixture layer 22A to the thickness B of the second mixture layer 22B in the positive electrode mixture layer 22 of the positive electrode 13a of Example 2 is 0.15.

When a pore size distribution in the positive electrode mixture layer 22 of the positive electrode 13a of Example 2 was measured using a mercury porosimeter, and a maximum value (dmax) of pore sizes was determined, it was found that dmax was 3.0 μm.

Example 3

The positive electrode 13a of Example 3 was prepared in the same manner as in Example 1 except that the second positive electrode mixture paste of Example 1 was applied onto each of both surfaces of a 15 μm-thick aluminum foil as the current collector 21 in an amount of 8 mg/cm$^2$, and the first positive electrode mixture paste of Example 1 was then applied in an amount of 7 mg/cm² onto the second positive electrode mixture paste applied onto each of both surfaces of the aluminum foil. The nonaqueous electrolyte secondary battery 1 of Example 3 was formed in the same manner as in Example 1 except that the positive electrode 13a of Example 3 was used.

The ratio (A/B) of the thickness A of the first mixture layer 22A to the thickness B of the second mixture layer 22B in the positive electrode mixture layer 22 of the positive electrode 13a of Example 3 is 0.88.

When a pore size distribution in the positive electrode mixture layer 22 of the positive electrode 13a of Example 3 was measured using a mercury porosimeter, and a maximum value (dmax) of pore sizes was determined, it was found that dmax was 3.1 µm.

Comparative Example 1

The positive electrode 13a of Comparative Example 1 was prepared in the same manner as in Example 1 except that the second positive electrode mixture paste of Example 1 was applied onto each of both surfaces of a 15 µm-thick aluminum foil as the current collector 21 in an amount of 14 mg/cm², and the first positive electrode mixture paste of Example 1 was then applied in an amount of 1 mg/cm² onto the second positive electrode mixture paste applied onto each of both surfaces of the aluminum foil. The nonaqueous electrolyte secondary battery 1 of Comparative Example 1 was formed in the same manner as in Example 1 except that the positive electrode 13a of Comparative Example 1 was used.

The ratio (A/B) of the thickness A of the first mixture layer 22A to the thickness B of the second mixture layer 22B in the positive electrode mixture layer 22 of the positive electrode 13a of Comparative Example 1 is 0.07.

When a pore size distribution in the positive electrode mixture layer 22 of the positive electrode 13a of Comparative Example 1 was measured using a mercury porosimeter, and a maximum value (dmax) of pore sizes was determined, it was found that dmax was 3.0 µm.

Comparative Example 2

The positive electrode 13a of Comparative Example 2 was prepared in the same manner as in Example 1 except that the second positive electrode mixture paste of Example 1 was applied onto each of both surfaces of a 15 µm-thick aluminum foil as the current collector 21 in an amount of 7 mg/cm², and the first positive electrode mixture paste of Example 1 was then applied in an amount of 8 mg/cm² onto the second positive electrode mixture paste applied onto each of both surfaces of the aluminum foil. The nonaqueous electrolyte secondary battery 1 of Comparative Example 2 was formed in the same manner as in Example 1 except that the positive electrode 13a of Comparative Example 2 was used.

The ratio (A/B) of the thickness A of the first mixture layer 22A to the thickness B of the second mixture layer 22B in the positive electrode mixture layer 22 of the positive electrode 13a of Comparative Example 2 is 1.14.

When a pore size distribution in the positive electrode mixture layer 22 of the positive electrode 13a of Comparative Example 2 was measured using a mercury porosimeter, and a maximum value (dmax) of pore sizes was determined, it was found that dmax was 3.0 µm.

Example 4

A first positive electrode mixture paste of Example 4 was prepared in the same manner as in Example 1 except that the average bubble diameter of air microbubbles to be dispersed was 1.5 µm.

The positive electrode 13a of Example 4 was prepared in the same manner as in Example 1 such that the second positive electrode mixture paste of Example 1 was applied onto each of both surfaces of a 15 µm-thick aluminum foil as the current collector 21 in an amount of 10 mg/cm², and the first positive electrode mixture paste of Example 4 was then applied in an amount of 5 mg/cm² onto the second positive electrode mixture paste applied onto each of both surfaces of the aluminum foil. The nonaqueous electrolyte secondary battery 1 of Example 4 was formed in the same manner as in Example 1 except that the positive electrode 13a of Example 4 was used.

The ratio (A/B) of the thickness A of the first mixture layer 22A to the thickness B of the second mixture layer 22B in the positive electrode mixture layer 22 of the positive electrode 13a of Example 4 is 0.5.

When a pore size distribution in the positive electrode mixture layer 22 of the positive electrode 13a of Example 4 was measured using a mercury porosimeter, and a maximum value (dmax) of pore sizes was determined, it was found that dmax was 1.2 µm.

Example 5

A first positive electrode mixture paste of Example 5 was prepared in the same manner as in Example 1 except that the average bubble diameter of air microbubbles to be dispersed was 4.8 µm.

The positive electrode 13a of Example 5 was prepared in the same manner as in Example 1 such that the second positive electrode mixture paste of Example 1 was applied onto each of both surfaces of a 15 µm-thick aluminum foil as the current collector 21 in an amount of 10 mg/cm², and the first positive electrode mixture paste of Example 5 was then applied in an amount of 5 mg/cm² onto the second positive electrode mixture paste applied onto each of both surfaces of the aluminum foil. The nonaqueous electrolyte secondary battery 1 of Example 5 was formed in the same manner as in Example 1 except that the positive electrode 13a of Example 5 was used.

The ratio (A/B) of the thickness A of the first mixture layer 22A to the thickness B of the second mixture layer 22B in the positive electrode mixture layer 22 of the positive electrode 13a of Example 5 is 0.5.

When a pore size distribution in the positive electrode mixture layer 22 of the positive electrode 13a of Example 5 was measured using a mercury porosimeter, and a maximum value (dmax) of pore sizes was determined, it was found that dmax was 4.7 µm.

Comparative Example 3

A first positive electrode mixture paste of Comparative Example 3 was prepared in the same manner as in Example 1 except that the average bubble diameter of air microbubbles to be dispersed was 0.5 µm.

The positive electrode 13a of Comparative Example 3 was prepared in the same manner as in Example 1 such that the second positive electrode mixture paste of Example 1 was applied onto each of both surfaces of a 15 µm-thick aluminum foil as the current collector 21 in an amount of 10 mg/cm², and the first positive electrode mixture paste of Comparative Example 3 was then applied in an amount of 5 mg/cm² onto the second positive electrode mixture paste applied onto each of both surfaces of the aluminum foil. The nonaqueous electrolyte secondary battery 1 of Comparative Example 3 was formed in the same manner as in Example 1 except that the positive electrode 13a of Comparative Example 3 was used.

The ratio (A/B) of the thickness A of the first mixture layer 22A to the thickness B of the second mixture layer 22B in the positive electrode mixture layer 22 of the positive electrode 13a of Comparative Example 3 is 0.5.

When a pore size distribution in the positive electrode mixture layer 22 of the positive electrode 13a of Comparative Example 3 was measured using a mercury porosimeter, and a maximum value (dmax) of pore sizes was determined, it was found that dmax was 0.4 μm.

Comparative Example 4

A first positive electrode mixture paste of Comparative Example 4 was prepared in the same manner as in Example 1 except that the average bubble diameter of air microbubbles to be dispersed was 8.5 μm.

The positive electrode 13a of Comparative Example 4 was prepared in the same manner as in Example 1 such that the second positive electrode mixture paste of Example 1 was applied onto each of both surfaces of a 15 μm-thick aluminum foil as the current collector 21 in an amount of 10 mg/cm², and the first positive electrode mixture paste of Comparative Example 4 was then applied in an amount of 5 mg/cm² onto the second positive electrode mixture paste applied onto each of both surfaces of the aluminum foil. The nonaqueous electrolyte secondary battery 1 of Comparative Example 4 was formed in the same manner as in Example 1 except that the positive electrode 13a of Comparative Example 4 was used.

The ratio (A/B) of the thickness A of the first mixture layer 22A to the thickness B of the second mixture layer 22B in the positive electrode mixture layer 22 of the positive electrode 13a of Comparative Example 4 is 0.5.

When a pore size distribution in the positive electrode mixture layer 22 of the positive electrode 13a of Comparative Example 4 was measured using a mercury porosimeter, and a maximum value (dmax) of pore sizes was determined, it was found that dmax was 8.4 μm.

Comparative Example 5

A second positive electrode mixture paste of Comparative Example 5 was prepared in the same manner as in Example 1 except that the average particle diameter d50 of the positive electrode active material 31 was 15 μm.

The positive electrode 13a of Comparative Example 5 was prepared in the same manner as in Example 1 such that the second positive electrode mixture paste of Comparative Example 5 was applied onto each of both surfaces of a 15 μm-thick aluminum foil as the current collector 21 in an amount of 10 mg/cm², and the first positive electrode mixture paste of Example 1 was then applied in an amount of 5 mg/cm² onto the second positive electrode mixture paste applied onto each of both surfaces of the aluminum foil. The nonaqueous electrolyte secondary battery 1 of Comparative Example 5 was formed in the same manner as in Example 1 except that the positive electrode 13a of Comparative Example 5 was used.

The ratio (A/B) of the thickness A of the first mixture layer 22A to the thickness B of the second mixture layer 22B in the positive electrode mixture layer 22 of the positive electrode 13a of Comparative Example 5 is 0.5.

When a pore size distribution in the positive electrode mixture layer 22 of the positive electrode 13a of Comparative Example 5 was measured using a mercury porosimeter, and a maximum value (dmax) of pore sizes was determined, it was found that dmax was 3.1 μm.

Comparative Example 6

A second positive electrode mixture paste of Comparative Example 6 was prepared in the same manner as in Example 1 except that the average particle diameter d50 of the positive electrode active material was 3.0 μm. As a first positive electrode mixture paste of Comparative Example 6, a paste identical to the second positive electrode mixture paste of Comparative Example 6 was used. That is, the second positive electrode mixture paste of Comparative Example 6 includes a positive electrode active material having an average particle diameter d50 of 3.0 μm, and does not contain microbubbles.

The positive electrode 13a of Comparative Example 6 was prepared in the same manner as in Example 1 such that the second positive electrode mixture paste of Comparative Example 6 was applied onto each of both surfaces of a 15 μm-thick aluminum foil as the current collector 21 in an amount of 10 mg/cm², and the first positive electrode mixture paste of Comparative Example 6 was then applied in an amount of 5 mg/cm² onto the second positive electrode mixture paste applied onto each of both surfaces of the aluminum foil. The nonaqueous electrolyte secondary battery 1 of Comparative Example 6 was formed in the same manner as in Example 1 except that the positive electrode 13a of Comparative Example 6 was used.

The ratio (A/B) of the thickness A of the first mixture layer 22A to the thickness B of the second mixture layer 22B in the positive electrode mixture layer 22 of the positive electrode 13a of Comparative Example 6 is 0.5.

When a pore size distribution in the positive electrode mixture layer 22 of the positive electrode 13a of Comparative Example 6 was measured using a mercury porosimeter, and a maximum value (dmax) of pore sizes was determined, it was found that dmax was 0.1 μm.

<Overcharge Test>

An overcharge test was conducted for the nonaqueous electrolyte secondary batteries 1 of Examples 1 to 5 and the nonaqueous electrolyte secondary batteries 1 of Comparative examples 1 to 6 prepared in the manner described above.

The overcharge test was conducted with the charge current set to 24 A (equivalent to 1 C), the charge upper limit voltage set to 20 V and the environmental temperature set to 25° C. The number of tests for the nonaqueous electrolyte secondary battery 1 in each of examples (Examples 1 to 5 and Comparative Examples 1 to 6) was 10.

From the result of an overcharge test conducted for the nonaqueous electrolyte secondary battery 1 in each example, whether the current interrupt device 16 operated or not was determined to check quality of the nonaqueous electrolyte secondary battery 1 in each example. Whether the current interrupt device 16 operated or not was determined by measuring a battery voltage.

<Battery Resistance Measurement>

For the nonaqueous electrolyte secondary battery 1 in each example, a battery resistance was determined by applying a discharge pulse of 10 C and 10 seconds with a SOC (state of charge) of 60% and under an environment of 25° C. to measure an IV resistance.

<Capacity Retention Rate Measurement>

A charge-discharge cycle test was conducted for the nonaqueous electrolyte secondary battery 1 in each example, and a battery capacity was measured before and after the charge-discharge cycle test to determine a capacity retention rate after the cycle test in the nonaqueous electrolyte secondary battery 1 in each example.

For the charge-discharge cycle test, CC cycle charge-discharge at 2 C was performed 1000 times in a thermostatic bath at 50° C.

An initial capacity, i.e., a battery capacity before conducting the charge-discharge cycle test, was determined, a capacity after the cycle test, i.e., a battery capacity after conducting the charge-discharge cycle test, was determined, and the capacity after the cycle test was divided by the initial capacity to calculate the capacity retention rate (capacity retention rate=capacity after cycle test/initial capacity).

The nonaqueous electrolyte secondary battery 1 was charged to 4.1 V at a C rate of 1 C, then put at rest for 5 minutes, and then subjected to CCCV discharge (4.1 V, 1 C, 0.1 C cut), and CCCV discharge (3.0 V, 1 C, 0.1 C cut) to determine the battery capacity.

<Results of Overcharge Test, Battery Resistance Measurement and Capacity Retention Rate Measurement>

Results of the overcharge test, battery resistance measurement and capacity retention rate measurement conducted for the nonaqueous electrolyte secondary battery 1 in each example will be described. The results are shown in FIG. 3.

Figure 3:
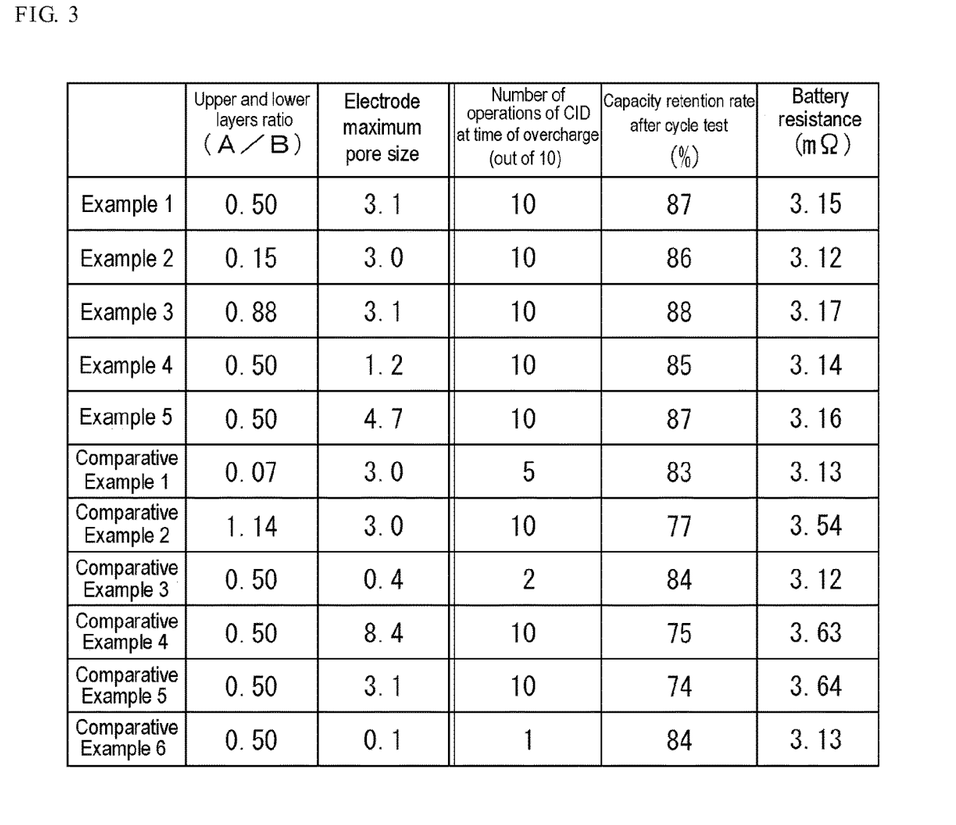
FIG. 3 shows the number of operations of a current interrupt device at the time of overcharge, the capacity retention rate after a cycle test, and the battery resistance in Examples 1 to 5 and Comparative Examples 1 to 6.

FIG. 3 shows that in all of the nonaqueous electrolyte secondary batteries 1 in Examples 1 to 5, the number of operations of the current interrupt device 16 at the time of overcharge is 10/10, and therefore the current interrupt device 16 reliably operates. The capacity retention rate is good as it falls within a range of 85% to 88%. The battery resistance is low as it falls within a range of 3.12 mΩ to 3.17 mΩ.

On the other hand, in the nonaqueous electrolyte secondary battery 1 of Comparative Example 1, the ratio (A/B) of the thickness A of the first mixture layer 22A to the thickness B of the second mixture layer 22B is 0.07, which is smaller than the lower limit of the range of more than 0.1 and 1.0 or less, and therefore the requirement of the ratio (A/B) of the thickness A of the first mixture layer 22A to the thickness B of the second mixture layer 22B in the nonaqueous electrolyte secondary battery 1 of this embodiment is not satisfied.

The number of operations of the current interrupt device 16 at the time of overcharge is 5/10, and therefore it cannot be said that the current interrupt device 16 reliably operates with stability. This is considered to be because the proportion of the first mixture layer 22A in the positive electrode mixture layer 22 is low, so that gas is not sufficiently generated at the time of overcharge of the nonaqueous electrolyte secondary battery 1.

On the other hand, in the nonaqueous electrolyte secondary battery 1 of Comparative Example 2, the ratio (A/B) of the thickness A of the first mixture layer 22A to the thickness B of the second mixture layer 22B is 1.14, which is larger than the upper limit of the range of more than 0.1 and 1.0 or less, and therefore the requirement of the ratio (A/B) of the thickness A of the first mixture layer 22A to the thickness B of the second mixture layer 22B in the nonaqueous electrolyte secondary battery 1 of this embodiment is not satisfied.

The battery resistance and the capacity retention rate are not good as the former is high (3.54 mΩ) and the latter is low (77%). This is considered to be because the proportion of the second mixture layer 22B in the positive electrode mixture layer 22 is low, so that conductivity in the positive electrode 13a is not sufficient.

In the nonaqueous electrolyte secondary battery 1 of Comparative Example 3, the maximum value (dmax) of the pore size in the positive electrode mixture layer 22 is 0.4 μm, which is smaller than the lower limit of the range of 1.0 μm or more and 5.0 μm or less, and therefore the requirement of the pore size of the first mixture layer 22A in the nonaqueous electrolyte secondary battery 1 of this embodiment is not satisfied.

The valve opening rate of the current interrupt device 16 is low as the number of operations of the current interrupt device 16 at the time of overcharge is 2/10, and therefore it cannot be said that the current interrupt device 16 reliably operates with stability. This is considered to be because the pore size of the first mixture layer 22A is small, so that generation of gas at the time of overcharge of the nonaqueous electrolyte secondary battery 1, and releasability of the gas in the positive electrode mixture layer 22 are not sufficient.

In the nonaqueous electrolyte secondary battery 1 of Comparative Example 4, the maximum value (dmax) of the pore size in the positive electrode mixture layer 22 is 8.4 μm, which is larger than the lower limit of the range of 1.0 μm or more and 5.0 μm or less, and therefore the requirement of the pore size of the first mixture layer 22A in the nonaqueous electrolyte secondary battery 1 of this embodiment is not satisfied.

The battery resistance and the capacity retention rate are not good as the former is high (3.63 mΩ) and the latter is low (75%). This is considered to be because the pore size in the first mixture layer 22A is excessively large, so that conductivity in the positive electrode mixture layer 22 is not sufficient.

In the nonaqueous electrolyte secondary battery 1 of Comparative Example 5, the average particle diameter d50 of the positive electrode active material 31 in the second mixture layer 22B is 15 μm, which is larger than the upper limit of the range of 2 μm or more and less than 7 μm, and therefore the requirement of the particle diameter of the positive electrode active material 31 of the positive electrode mixture layer 22 in the nonaqueous electrolyte secondary battery 1 of this embodiment is not satisfied.

The battery resistance and the capacity retention rate are not good as the former is high (3.64 mΩ) and the latter is low (74%). This is considered to be because the particle diameter of the positive electrode active material 31 in the second mixture layer 22B is excessively large, so that conductivity in the positive electrode 13a is not sufficient.

In the nonaqueous electrolyte secondary battery 1 of Comparative Example 6, the first positive electrode mixture paste in formation of the first mixture layer 22A does not contain microbubbles, the maximum value (dmax) of the pore size in the positive electrode mixture layer 22 is 0.1 μm, which is smaller than the lower limit of the range of 1.0 μm or more and 5.0 μm or less, and therefore the requirement of the pore size of the first mixture layer 22A in the nonaqueous electrolyte secondary battery 1 of this embodiment is not satisfied.

The valve opening rate of the current interrupt device 16 is low as the number of operations of the current interrupt device 16 at the time of overcharge is 1/10, and therefore it cannot be said that the current interrupt device 16 reliably operates with stability. This is considered to be because the pore size of the first mixture layer 22A is small, so that generation of gas at the time of overcharge of the nonaqueous electrolyte secondary battery 1, and release of the gas from the inside of the positive electrode mixture layer 22 are not sufficient.

From the above results, when the porosity of the positive electrode mixture layer 22 is controlled by dispersing microbubbles in the first positive electrode mixture paste in formation of the first mixture layer 22A, generation of gas at the time of overcharge and release of the gas from the positive electrode mixture layer 22 can be sufficiently performed while the high-rate characteristics of the nonaqueous electrolyte secondary battery 1 are maintained by reducing the particle diameter of the positive electrode active material 31 in the positive electrode mixture layer 22.

In Particular, when the porosity of the first mixture layer 22A on the surface side in the positive electrode mixture layer 22 is made greater than the porosity of the second mixture layer 22B on the current collector 21 side in the positive electrode mixture layer 22, the reactivity of an additive in the electrolyte solution at the time of overcharge can be improved, so that a larger amount of gas can be generated.

INDUSTRIAL APPLICABILITY

The present invention is applicable to a positive electrode for nonaqueous electrolyte secondary batteries, and a nonaqueous electrolyte secondary battery, in which a positive electrode mixture paste is applied to a current collector, and particularly to a positive electrode for nonaqueous electrolyte secondary batteries each including a current interrupt device (CID), and a nonaqueous electrolyte secondary battery including the current interrupt device (CID).

REFERENCE SIGNS LIST

1: nonaqueous electrolyte secondary battery
12: case
13: electrode body
13a: positive electrode
14a: positive electrode terminal
15a: first collecting terminal
16: current interrupt device (CID)
21: current collector
22: positive electrode mixture layer
22A: first mixture layer
22B: second mixture layer
31: positive electrode active material
32: conductive material
33: pore

The invention claimed is:

1. A positive electrode for nonaqueous electrolyte secondary batteries, comprising:
   a current collector; and
   a positive electrode mixture layer formed by applying a positive electrode mixture paste to the current collector, the positive electrode mixture paste containing a positive electrode active material,
   wherein the positive electrode active material has a particle diameter of 2 μm or more and less than 7 μm,
   wherein the positive electrode mixture layer includes a first mixture layer in which a maximum diameter of pores formed between particles of the positive electrode active material is more than 1.0 μm and 5.0 μm or less, and a second mixture layer in which a maximum diameter of the pores is 1.0 μm or less,
   wherein the second mixture layer is arranged closer to the current collector than the first mixture layer, and
   wherein a ratio of a thickness of the first mixture layer to a thickness of the second mixture layer is more than 0.1 and 1.0 or less.

2. A nonaqueous electrolyte secondary battery, comprising:
   the positive electrode according to claim 1.

3. The positive electrode for nonaqueous electrolyte secondary batteries according to claim 1, wherein the pores in the first mixture layer are formed form microbubbles.

4. A nonaqueous electrolyte secondary battery, comprising:
   the positive electrode according to claim 3.

* * * * *